US006555090B1

(12) United States Patent
Chica Lara et al.

(10) Patent No.: US 6,555,090 B1
(45) Date of Patent: Apr. 29, 2003

(54) ACID OXIDE WITH MICRO AND MESOPOROUS CHARACTERISTICS: ITQ-36

(75) Inventors: Antonio Chica Lara, Valencia (ES); Avelino Corma Canós, Valencia (ES); Vicente Fornés Segúi, Valencia (ES); Urbano Díaz Morales, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 0 days.

(21) Appl. No.: 09/830,819

(22) PCT Filed: Oct. 26, 1999

(86) PCT No.: PCT/ES99/00344

§ 371 (c)(1),
(2), (4) Date: Jul. 6, 2001

(87) PCT Pub. No.: WO00/24673

PCT Pub. Date: May 4, 2000

(30) Foreign Application Priority Data

Oct. 27, 1998 (ES) ............................................ 9802283

(51) Int. Cl.[7] .......................... C01B 34/00; C07C 5/00; C10G 73/02; C10G 11/00

(52) U.S. Cl. .................... 423/718; 423/329.1; 585/750; 585/739; 208/28; 208/113; 208/119

(58) Field of Search ............................. 423/719, 329.1; 585/750, 734; 208/28, 113, 119

(56) References Cited

FOREIGN PATENT DOCUMENTS

WO WO9211934 * 7/1992
WO WO9717290 * 5/1997

* cited by examiner

*Primary Examiner*—Thuan D. Dang
(74) *Attorney, Agent, or Firm*—Klauber & Jackson

(57) ABSTRACT

The invention deals with a microporous crystalline material, with a characteristic X-ray diffractogram, comprised of oxygen tetrahedra and a metal ($T^{+4}$ and $T^{+3}$) with the possibility of introducing surface acidity produced by the substitution in the lattice of some $T^{+4}$ cations by $T^{+3}$ cations, which gives rise to a structural charge deficiency that may be compensated by protons, Brönsted acidity, and/or high ratio radium charge cations, Lewis acidity; and the obtaining method thereof, based on the preparation of a gel, its hydrothermal treatment under controlled conditions and the treatment of the resulting laminar material with a solution of an organic compound, a swollen material being obtained, which is subjected to a treatment for the formation of interlaminar pillars of polymeric oxides, obtaining a pillared material that maintains the separation between the sheets, even after calcination.

41 Claims, 1 Drawing Sheet

ACID OXIDE WITH MICRO AND MESOPOROUS CHARACTERISTICS: ITQ-36

TECHNICAL FIELD

The present invention refers to the area of chemistry, in particular to materials of catalytic interest

BACKGROUND

The present invention deals with a pillared mixed oxide that maintains a separation between sheets, there being individual structural layers, that have microporous channels and cavities.

Laminar materials such as clays, phosphates, hydroxycarbonates, silicic acids (kanemite, magadiite, keniaite, etc.), transition metal sulfides, graphite, laminar hydroxides and others, are capable of swelling in the presence of water and/or suitable interlaminar cations. The individual sheets of these materials are kept together by means of weak hydrogen bond type forces and/or electrostatic interactions. These bonds break easily when the intercalation force or the solvation energy of the cations are greater than the interlaminar attraction forces.

The interest of swollen materials is to make the interlaminar space accessible to the reacting molecules, and consequently, the inside surface, considerably increasing the active surface accessible to the reagent. When the material intercalated between the sheets of the mixed oxide is eliminated by calcination, the swollen laminar compound collapses, recovering the original interlaminar distance.

In order to prevent the interlaminar collapse, intercalation of the "pillars" comprised of thermally stable inorganic oxyhydroxides in the swollen material has been proposed. These "pillars" are comprised of polymeric hydroxides of Al, Si, Cr, Ni, Zr, etc. . . . , which after calcination treatment give rise to columns of the corresponding oxide that are anchored in the surface of the sheets keeping them separated and stabilizing the final pillared product.

OBJECTS OF THE INVENTION

It is an object of the present invention to provide a pillared material consisting of a mixed oxide, which maintains a separation among sheets, appearing isolated structural layers with channels and microporous cavities, and which may be used as catalyst in acid catalyzed reactions.

It is an additional object of the present invention a method for preparing the laminar solid and the subsequent treatment thereof, until a highly accessible microporous pillared material with acid characteristics capable of being used as a catalyst is obtained.

It is an additional object of the invention the use of the pillared microporous material in acid catalyzed reactions, such as cracking and isomerization of organic compounds, and preferably of hydrocarbons, as well as in hydroisomerization and hydrocracking processes.

It is a further object of the invention to provide catalytic compounds which comprise the pillared micro- or mesoporous material and a matrix and their use in processes of dewaxing and isodewaxing.

Finally, it is an additional object of the invention catalytic compositions which comprise the pillared micro- or mesoporous material and a hydrogenating function.

DESCRIPTION OF THE INVENTION

The present invention refers to an oxide which is a pillared material, called ITQ-36, with a micro- and mesoporous structure and a high external surface area, capable of supporting Brönsted and Lewis acid centers and that is characterized by its X-ray diffractogram and its adsorption and catalytic properties.

The material ITQ-36 has a chemical composition represented by the formula $$(XO_2)_n(Y_2O_3)_m(H_2O)_p$$

wherein X represents, at least, a tetravalent element and Y represents, at least, a trivalent element, the atomic ratio between X and Y being at least 5. In preferred embodiments the atomic ratio between X and Y is higher than 10, or even higher than 30. In a more preferred embodiment said atomic ratio is higher than 30, or even higher than 40. Suitable limits for said atomic ratio may be between 30 and 500.

Preferably, X in $XO_2$ represents, at least, a tetravalent element selected from among silicon, germanium and, more specifically silicon, in some cases it being able to also be titanium.

Preferably, Y in $Y_2O_3$ represents, at least, a trivalent, element, selected from among aluminum, iron, chromium and gallium, and more specifically aluminum.

The material ITQ-36 has an X-ray diffraction diagram with basal spacings and relative intensities summarized in Table 1.

TABLE 1

| d (Å) | $I/I_O$ * 100 |
|---|---|
| 37.01 | Vs |
| 18.77 | W |
| 7.01 | W |
| 6.51 | W |
| 3.95 | W |
| 3.50 | W |
| 2.62 | W |
| 2.35 | W |

In this description, and unless it is specified otherwise, the relative intensities of the X-ray diffraction peaks will be represented with the symbols and meaning established hereinafter:

| | | | |
|---|---|---|---|
| w | weak | 0–20% | relative intensity |
| m | medium | 20–40% | |
| s | strong | 40–60% | |
| vs | very strong | 60–100% | |

The preparation process of the pillared oxide ITQ-36 consists of:

- a first step comprising the synthesis of a precursor which is a laminar material that can be swollen,
- a second step wherein the laminar material obtained is swollen by mixing the same with a swelling solution resulting in a swollen laminar material, which is a swollen laminar mixed oxide,
- a third step wherein the swollen laminar material is washed and dried giving rise to a swollen dried laminar material, and
- a fourth step wherein the swollen dried laminar material is pillared, washed, dried and calcined, to obtain the pillared mixed oxide, ITQ-36, of the invention.

In the first step the synthesis of a solid which is a laminar material, is carried out by mixing in an autoclave a source of a tetravalent element, which in the case of silicon may be for example a silica source such as AEROSIL, LUDOX, CABOSIL, tetraethylorthosilicate (TEOS) or any other known; a source of a trivalent element, which in the case of aluminum may be a source selected among boehmite, pseudoboehmite, $Al_2(SO_4)_3$, $AlCl_3$, $Al(NO_3)$ or any other one; a fluoride salt and a fluoride acid such as for example ammonium fluoride and hydrogen fluoride; an organic compound such as 1,4-diaminobutane, ethylendiamine, 1,4-dimethylpiperazine, 1,4-diaminocyclohexane, hexamethylenimine and pyrrolidine, preferably, 4-amino-2,2,6,6-tetramethylpiperidine; and water in suitable proportions.

Synthesis of said solid material takes place at temperatures between 100 and 200° C., with permanent stirring of the gel and a duration between 1 and 30 days and, preferably between 1 and 18 days, and more preferably between 2 and 12 days. After this time the reaction product, a white solid with a pH between 9 and 10 is washed with distilled water, filtered and dried.

During the second step swelling of the obtained solid material takes place by preparing a suspension thereof in a solution that we will call the "swelling" solution, formed by an organic compound of a long hydrocarbonated chain that has a proton acceptor group, such as for example a quaternary alkylammonium, an amine, or an alcohol with more than three carbons in the chain, to which a controlled amount of a compound capable of providing $OH^-$ to the reaction medium, such as for example, a quaternary alkylammonium hydroxide is added, until a pH higher than 10 is obtained. The organic compound used as a $OH^-$ source may be any amine or quaternary alkylammonium compound, preferably cetyltrimethylammonium hydroxide ($CTMA^+OH^-$).

The swelling solution prepared is mixed with the previously described solid material of the first step in a weight ratio of swelling solution to solid laminar material between 4 and 200. The resulting suspension is kept under reflux and permanent stirring between 20 and 200° C., and preferably between 40 and 120° C., for a time no less than 1 hour until the swollen laminar material is obtained.

During the third step the swollen laminar material is thoroughly washed with distilled water and dried at temperatures lower than 300° C. and preferably lower than 150° C. A swollen dried laminar material is thus obtained.

Once washed and dried, the swollen dried material has a characteristic X-ray diffraction diagram whose basal spacings and relative intensities are summarized in Table 2.

TABLE 2

| d (Å) | $I/I_O$ * 100 |
|---|---|
| 28.20 | Vs |
| 14.45 | S |
| 9.81 | W |
| 6.46 | W |
| 4.31 | M |
| 4.10 | M |
| 3.93 | M |
| 3.65 | W |
| 3.49 | M |
| 2.87 | W |
| 2.62 | W |

Then the pillaring process is proceeded with during the fourth step. For this purpose, a suspension of swollen dried material in a pillaring agent, preferably tetraethylorthosilicate (TEOS) is prepared, in a variable weight proportion between 2 and 20. This suspension is kept under reflux and constant stirring, at a temperature between 30 and 150° C., and preferably between 50 and 80° C., for a time no less than 1 hour and with permanent nitrogen flow until the pillared material is obtained.

During the fourth step the obtained pillared material is washed and dried at temperatures lower than 300° C. Once dry, it is calcined at temperatures between 300 and 800° C. and, preferably between 400 and 600° C. giving rise to the product ITQ-36.

Pillaring agents include polymeric oxides of elements of group IVA of the Periodic Table of the elements, such as silicon, germanium or tin, or of group IVB such as titanium, zirconium, etc., although pillars that include polymeric silica are usually chosen. The pillaring oxides could also include an element that provides catalytically active acid sites in the pillars, preferably aluminum, gallium, rare earth or mixtures thereof.

ITQ-36 has, together with its laminar nature and X-ray diffractogram, some characteristic textural properties as a result of having a microporous part, and a high external surface area as a result of the cavities formed by the intercalation of pillars between the sheets. Hence, Table 3 summarizes the values obtained for a sample of ITQ-36 by applying the BET equation to the nitrogen adsorption isotherm at the temperature of liquid nitrogen.

TABLE 3

| | $S_{TOT}$ ($m^2/g$) | $S_{MIC}$ ($m^2/g$) | $S_{EXT}$ ($m^2/g$) | $V_{TOT}$ ($cm^3/g$) | $V_{MIC}$ ($cm^3/g$) |
|---|---|---|---|---|---|
| ITQ-36 | 716 | 68 | 648 | 0.7094 | 0.2734 |

The material ITQ-36 may undergoes a subsequent hydrothermal calcination step or a post-calcination in the presence of fluorine or a fluorine compound, or treatment with a phosphorous compound.

This material ITQ-36 is capable of being used as a catalyst in acid catalysis reactions such as cracking and isomerization of organic compounds, and preferably of hydrocarbons, as well as in hydroisomerization and hydrocracking for which a hydrogenating-dehydrogenating function such as for example platinum, palladium, nickel, rhodium, ruthenium or mixtures thereof is introduced together with the acid function.

The invention also refers to a catalytic composition that comprises an oxide material as ITQ-36 and a hydrogenating function such as Pt, Pd, Ru, Ni, Co, Mo, V, W, Rh or any of the combinations thereof, whether they are deposited on the oxide material or on a high surface support such as alumina, silica or silica-alumina.

The invention further refers to the use of a catalytic composition as defined in the preceding paragraph in a process for the isodewaxing of paraffins that comprises contacting the hydrocarbon feed together with hydrogen at temperatures between 250 and 400° C., at pressures between 10 and 90 atmospheres, with the catalytic composition, as well as the use of said catalytic composition as a dewaxing catalyst.

The invention additionally refers to a catalytic compound formed by an oxide material as ITQ-36 and a matrix, which may be a refractory oxide.

The invention also refers to the use of said catalytic compound in a process for the catalytic isomerization of n-butenes in isobutenes that involves contacting the hydrocarbon with the catalytic compound, at temperatures between 300 and 500°, as well as the use of said catalytic compound in a hydrocarbon cracking process that comprises contacting the hydrocarbons with said catalytic compound, at temperatures higher than 400° C. and that may or may not be in the presence of steam.

EXAMPLES

Example 1

(i) Preparation of the Swollen Laminar Mixed Oxide:

This example describes the preparation of a laminar mixed oxide with a molar Si/Al ratio, in the starting gel, of 5. The laminar oxide was prepared by mixing in an autoclave 10 grams of $SiO_2$(Aerosil 200, Degussa), 2.3 grams of $Al_2O_3$ (boehmite, Catapal B, Vista Corp., with 73.7% $Al_2O_3$), 9.2 grams of ammonium fluoride $NH_4F$, Aldrich of 98% purity), 3.1 grams of hydrofluoric acid (HF, Aldrich at a concentration of 49.8%), 26 grams of 4-amino-2,2,6,6-tetramethylpiperidine (Fluka of 98% purity) and 27.9 grams of MiliQ deionized water. The synthesis gel, with a pH between 8 and 9, was kept with vigorous stirring for an hour at room temperature. The resulting mixture was introduced in autoclaves and kept at 175° C. for five days after which the resulting product was filtered and washed with 3 liters of deionized water up to a pH $\leqq$9, then drying in an oven at 60° C.

One gram (1 gr.) of the laminar material obtained is exchanged with a solution prepared with 20 grams of $CTMA^+OH^-$ (29% solution), 6 grams of tetrapropylammonium hydroxide ($TPA^+OH^-$ 40% solution) and 4 grams of deionized water. The solution obtained is kept, under reflux and vigorous stirring, for 16 hours at 95° C. The suspension is finally washed thoroughly with water before the liquid phase separates from the obtained solid. The swollen material (1.8 grams) has a diffraction diagram summarized in Table 2.

(ii) Preparation of the Pillared Laminar Material Described in the Invention:

A suspension comprised of 1.5 gr. of the swollen laminar material together with 3 gr. of tetraethylorthosilicate, TEOS, (Merck) is formed. This mixture is treated under reflux with constant stirring at a temperature of 60° C. for 16 hours, always under an inert nitrogen atmosphere. Then the solid is recovered by centrifugation (12000 rpm for 25 minutes). The obtained material is dried at 60° C. overnight, and it is finally calcined at 580° C. for 7 hours in the presence of air, in order to produce a material, in accordance with the present invention (1 gram), with a diffraction diagram like the one in FIG. 2 with the relative intensities summarized in Table 1.

Example 2

The process followed in example 1 was repeated except the fact that the amounts of reagents in step (i) were varied in order to obtain a gel with a molar Si/Al ratio of 30.

Figure 2:
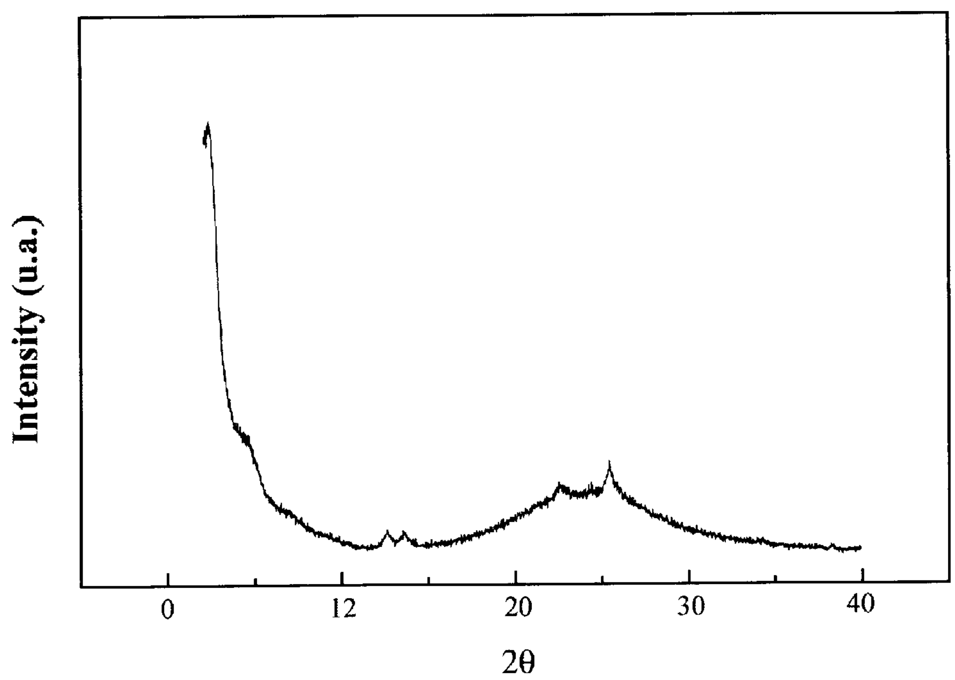

The oxide obtained at the end of step (ii) has a diffraction diagram like the one in FIG. 2 and intensities like those of Table 1.

Example 3

The process followed in example 1 was repeated, except that in step (ii) a suspension comprised of 1.5 gr. of the swollen material and 15 gr. of tetraethylorthosilicate (TEOS) was formed, keeping the mixture under reflux for 24 hours at 80° C. with a nitrogen atmosphere. Once calcined, a product that has a diffraction diagram like the one in FIG. 2 was obtained.

Example 4

Figure 1:
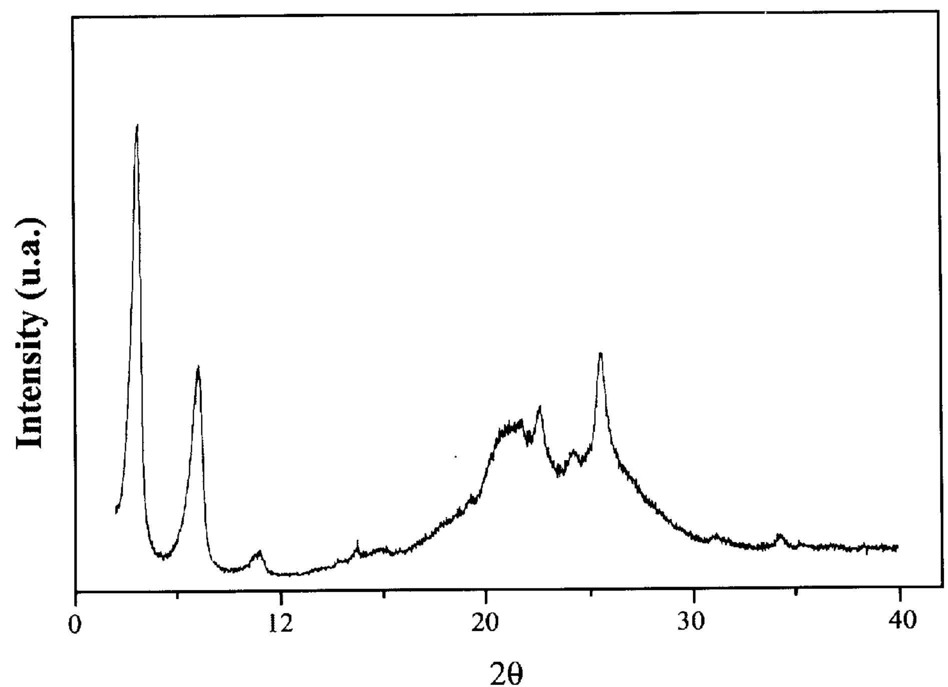
FIG. 1 represents the characteristic X-ray diffraction diagram of the swollen dried material and FIG. 2 represents a diffractogram of ITQ-36.

The process followed in example 1 was repeated except the fact that in step (i) N,N-tetradecylammonium (29% solution) was used instead of cetyltrimethylammonium hydroxide ($CTMA^+OH^-$). The swollen material, that has a diffractogram like the one of FIG. 1 and relative intensitites comparable to those of Table 2, is obtained.

Example 5

Catalytic Experiments:

0.05% by weight of platinum was added by impregation with $PtCl_6$ to a sample of ITQ-36 with a Si/Al ratio of 30. The final material, after being calcined at 500° C. for 3 h, was reduced in a fixed bed reactor passing $H_2$ (300 ml.min$^{-1}$), the molar $H_2$/n- hexadecane ratio being 50. The reaction conditions were: 40 atmospheres of total pressure and reaction temperatures between 290° C. and 350° C.

The results obtained, that are given in table 4, show that the catalyst based on ITQ-36 is suitable to carry dewaxing of hydrocarbons.

TABLE 4

| Temperature ° C. | % Conversion | % Isomerization | % Cracking | % Mono-branched | % Di-branched | % Tri-branched |
|---|---|---|---|---|---|---|
| 294 | 20.72 | 2.67 | 18.05 | 2.67 | 0.19 | 0 |
| 310 | 72.53 | 3.51 | 69.02 | 3.51 | 0 | 0 |
| 322 | 88.91 | 3.26 | 85.65 | 3.26 | 0.67 | 0.07 |
| 335 | 96.64 | 2.36 | 94.29 | 2.36 | 0.67 | 0–17 |

What is claimed is:

1. A pillared laminar oxide material with an interlaminar space pillared by at least a polymeric oxide comprising the oxides $XO_2$ and $Y_2O_3$, wherein X represents one or more tetravalent elements and Y represents one or more trivalent elements, and which has, in its calcined form, an X-ray diffractogram with basal spacings and relative intensities corresponding to:

| d(Å) | $I/I_0$*100 |
|---|---|
| 37.01 | 60–100% |
| 18.77 | 0–20% |
| 7.01 | 0–20% |
| 6.51 | 0–20% |
| 3.95 | 0–20% |
| 3.50 | 0–20% |

-continued

| d(Å) | $I/I_0$*100 |
|---|---|
| 2.62 | 0–20% |
| 2.35 | 0–20%. |

2. An oxide material according to claim 1, that has, in its calcined form, the following surface characteristics:

$S_{EXT}$ of at least 500 $m^2/g$ and $S_{MIC}$ higher than 0 wherein $S_{EXT}$ means specific external surface and $S_{MIC}$ means micropores surface.

3. An oxide material, according to claim 2, that has, in its calcined form, surface characteristics as follows:

$S_{TOT}$ 716 $m^2/g$ $S_{MIC}$ 68 $m^2/g$ $S_{EXT}$ 648 $m^2/g$ $V_{TOT}$ 0.7094 $cm^3/g$ and $V_{MIC}$ 0.2734 $cm^3/g$ wherein $S_{TOT}$ means total surface, $S_{MIC}$ means micropores surface, $S_{EXT}$ means specific external surface, $V_{TOT}$ means total volume and $V_{MIC}$ means micropores volume.

4. An oxide material, according to claim 1, wherein the atomic ratio between X and Y is at least 5.

5. An oxide material, according to claim 1, wherein the atomic ratio of X to Y is higher than 10.

6. An oxide material, according to claim 1, wherein the atomic ratio of X to Y is higher than 30.

7. An oxide material, according to claim 1, wherein the atomic ratio of X to Y is higher than 40.

8. An oxide material, according to claim 1, wherein the atomic ratio of X to Y is in the range between 30 and 500.

9. An oxide material, according to claim 1, wherein in the $XO_2$ oxide, X represents at least a tetravalent element selected from the group consisting of silicon, germanium, and titanium.

10. An oxide material, according to claim 1, wherein X represents silicon.

11. An oxide material, according to claim 1, wherein in the $Y_2O_3$ oxide Y represents at least a trivalent element selected from the group consisting of aluminum, boron, iron, chromium and gallium.

12. An oxide material, according to claim 1, wherein Y represents aluminum.

13. An oxide material, according to claim 1, wherein X represents silicon and Y represents aluminum.

14. A process for the preparation of an oxide material, as defined in claim 1, and that comprises, a first step, wherein a laminar precursor capable of being swollen is prepared, by mixing a source of at least a tetravalent element, a source of at feast a trivalent element, a fluoride salt and a fluoride acid, an organic compound selected from the group consisting of 1,4-diaminobutane, ethylenediamine, 1,4-dimethylpiperazine, 1,4-diaminocyclohexane, hexamethyleneimine, pyrrolidine, and 4-amino-2,2,6,6-tetramethylpiperidine; and water, in an autoclave, the mixture being continuously stirred at temperatures between 100° C. and 200° C. during a period between 1 and 30 days, until a solid is obtained which is washed and dried at a temperature below 300° C. and is capable of being swollen, a second step wherein the solid capable of being swollen is mixed with a "swelling" solution in a weight ratio of swelling solution to precursor laminar material between 4 and 200, being the resulting suspension kept under reflux and permanent stirring between 20 and 200° C. for a time no less than 1 hour, wherein the swelling solution has a pH higher than 10 and comprises an organic compound of long hydrocarbonated chain with a proton acceptor group, and an $OH^-$ donator group, obtaining a swollen laminar material, a third step wherein the swollen laminar material is thoroughly washed and dried giving rise to a swollen dried laminar material, which has a characteristic X-ray diffraction diagram with basal spacings and relative intensities corresponding to:

| d (Å) | $I/I_O$ * 100 |
|---|---|
| 28.20 | 60–100% |
| 14.45 | 40–60% |
| 9.81 | 0–20% |
| 6.46 | 0–20% |
| 4.31 | 20–40% |
| 4.10 | 20–40% |
| 3.93 | 20–40% |
| 3.65 | 0–20% |
| 3.49 | 20–40% M |
| 2.87 | 0–20% |
| 2.62 | 0–20% |

and a fourth step wherein the swollen dried laminar material is pillared by means of pillaring agents, using a suspension of the swollen dried material in a pillaring agent with a weight proportion between 2 and 20, keeping said suspension under reflux and nitrogen flow for at least one hour, washing the obtained pillared material, drying it and calcining, to obtain the pillared mixed oxide, ITQ-36.

15. A process according to claim 14, wherein the source of tetravalent element is a silicon source and the source of trivalent element is an aluminum source.

16. A process according to claim 15, wherein the source of silicon is a silica source selected from the group consisting of an extremely fine particle size silica aerogel, an aerogel consisting of hydrophillic fumed silica, an aqueous colloidal dispersion of small silica particles and tetraethylorthosilicate (TEOS).

17. A process according to claim 15, wherein the source of aluminum is selected from the group consisting of boehmite, pseudoboehmite, $Al_2(SO_4)_3$, $AlCl_3$ and $Al(NO_3)$.

18. A process according to claim 14, wherein the fluoride salt and fluoride acid source are ammonium fluoride and hydrogen fluoride respectively.

19. A process according to claim 14, wherein the organic compound in the first step is 4-amino-2,2,6,6-tetramethylpiperidine.

20. A process according to claim 14, wherein the first step is carried out during a period of between 2 and 12 days at an autogenous pressure in an autoclave.

21. A process according to claim 14, wherein the solid obtained in the first step has a pH between 9 and 10.

22. A process according to claim 14, wherein the solid obtained in the first step is dried at a temperature lower than 200° C.

23. A process according to claim 14, wherein the organic compound of the swelling solution is selected from the group consisting of a quaternary alkylaimonium, an amine and an alcohol with more than three carbons in the chain.

24. A process according to claim 14, wherein the source of $OH^-$ groups in the swelling solution is cetyltrimethylammonium hydroxide.

25. A process according to claim 14, wherein in the second step the solid material capable of being swollen is maintained in the swelling solution at a temperature between 40° C. and 120° C.

26. A process according to claim 14, wherein the swollen laminar material is dried at a temperature lower than 150° C.

27. A process according to claim 14, wherein the pillaring agents are polymeric oxides of elements selected from the group consisting of elements of group IVA, elements of group IVB of the Periodic Table.

28. A process according to claim 14, wherein the pillaring agents further contain elements that provide catalytically active acid sites in the pillars.

29. A process according to claim 28, wherein the elements that provide catalytically active acid sites in the pillars are selected from the group consisting of aluminum, gallium, rare earth and mixtures thereof.

30. A process according to claim 14, wherein the pillaring agent is tetraethylorthosilicate.

31. A process according to claim 14, wherein in the fourth step the pillared laminar material is calcined at temperatures between 300 and 800° C.

32. A process, according to claim 14, wherein the material ITQ-36 undergoes a subsequent hydrothermal calcination step.

33. A process, according to claim 14, wherein the material ITQ-36 undergoes a post-calcination in the presence of fluorine or a fluorine compound.

34. A process, according to claim 14, wherein the material ITQ-36 undergoes a treatment with a phosphorous compound.

35. A catalytic composition that comprises an oxide material according to claim 1 and a hydrogenating function selected from the group consisting of Pt, Pd, Ru, Ni, Co, Mo, V, W, Rh and any of the combinations thereof, whether they are deposited on the oxide material or on a high surface support selected from the group consisting of aiumina, silica and silica-alumina.

36. A process for the isodewaxing of paraffins that comprises contacting the hydrocarbon feed together with hydrogen at temperatures between 250 and 400° C., at pressures between 10 and 90 atmospheres, with the catalytic composition of claim 35.

37. A process for the dewaxing of paraffins that comprises contacting the hydrocarbon feed together with hydrogen at an appropriate pressure and temperature, with the catalytic composition of claim 35.

38. A catalytic compound formed by an oxide material, according to claim 1 and a matrix.

39. A catalytic compound, according to claim 38, wherein the matrix is a refractory oxide.

40. A process for the catalytic isomerization of n-butenes in isobutenes that involves contacting the hydrocarbon with the catalytic compound of claim 38, at temperatures between 300 and 500° C.

41. A hydrocarbon cracking process that comprises contacting the hydrocarbons with the catalytic compound of claim 38, at temperatures higher than 400° C. and that may or may not be in the presence of steam.

* * * * *